(12) United States Patent
Condon et al.

(10) Patent No.: US 8,002,327 B2
(45) Date of Patent: Aug. 23, 2011

(54) MOTOR VEHICLE

(75) Inventors: Alan Richard Condon, East Hanningfield (GB); John K Harding, Leigh-on-Sea (GB); Torsten Gerhardt, London (GB)

(73) Assignee: Ford Global Technologies, Dearborn, MI (US)

( * ) Notice: Subject to any disclaimer, the term of this patent is extended or adjusted under 35 U.S.C. 154(b) by 390 days.

(21) Appl. No.: 12/293,135

(22) PCT Filed: Mar. 8, 2007

(86) PCT No.: PCT/GB2007/050113
§ 371 (c)(1),
(2), (4) Date: Sep. 19, 2008

(87) PCT Pub. No.: WO2007/105013
PCT Pub. Date: Sep. 20, 2007

(65) Prior Publication Data
US 2010/0259065 A1   Oct. 14, 2010

(30) Foreign Application Priority Data
Mar. 16, 2006 (GB) .................................. 0605287.2

(51) Int. Cl.
*B60J 7/14* (2006.01)
(52) U.S. Cl. ......... 296/107.08; 296/136.06; 296/146.14; 296/108; 296/107.07; 296/107.17

(58) Field of Classification Search ............. 296/146.16, 296/146.14, 108, 107.07, 107.08, 107.17, 296/136.06, 135, 107.05
See application file for complete search history.

(56) References Cited

U.S. PATENT DOCUMENTS

| | | | |
|---|---|---|---|
| 5,967,593 A * | 10/1999 | Schuler et al. ........... 296/136.06 |
| 6,682,149 B1 | 1/2004 | Guillez et al. |
| 7,032,947 B2 * | 4/2006 | Queveau et al. ........... 296/24.44 |
| 2003/0057727 A1 | 3/2003 | Tohda et al. |
| 2005/0236855 A1 | 10/2005 | Queveau et al. |

FOREIGN PATENT DOCUMENTS

| DE | 3613017 A | 10/1987 |
|---|---|---|
| DE | 3616017 A1 | 11/1987 |
| DE | 9419035 U1 | 3/1995 |
| DE | 19714104 C1 | 6/1998 |

(Continued)

OTHER PUBLICATIONS

Machine Translation of EP1630023, printed from the internet, Dec. 9, 2010.*

*Primary Examiner* — Jason S Morrow
(74) *Attorney, Agent, or Firm* — Jerome R. Brouillard; Greg Brown

(57) ABSTRACT

A motor vehicle (5) has a roof structure including a front roof member (6) and a rear member (4) which together form a cover for a passenger compartment (I) of the motor vehicle (5) when both of the roof members (4, 6) are in respective raised positions. When both of the roof members (4, 6) are lowered into stowed positions to form a convertible vehicle, a flap (7, 107) is deployed on each side of the motor vehicle (5) to bridge a gap between the stowed front roof member (6) and an upper edge of an outer rear panel (9).

12 Claims, 17 Drawing Sheets

FOREIGN PATENT DOCUMENTS

| | | |
|---|---|---|
| DE | 19803883 A1 | 8/1999 |
| DE | 10333600 A1 | 2/2005 |
| EP | 0943474 A2 | 9/1999 |
| EP | 1245419 A1 | 10/2002 |
| EP | 1338454 A1 | 8/2003 |
| EP | 1531072 A1 | 5/2005 |
| EP | 1595730 A2 | 11/2005 |
| EP | 1630022 A1 | 3/2006 |
| EP | 1630023 A | 3/2006 |

* cited by examiner

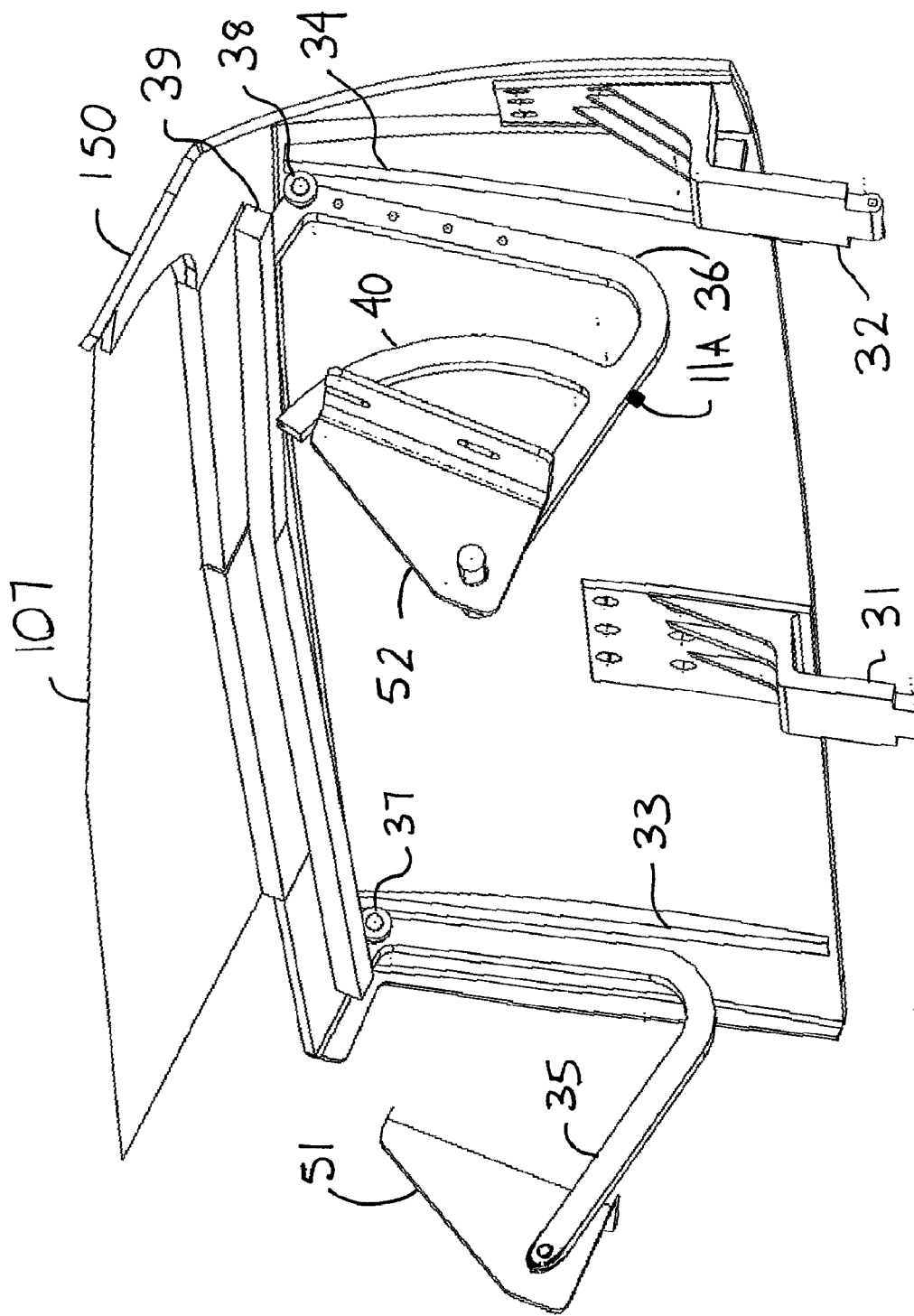

MOTOR VEHICLE

BACKGROUND OF THE INVENTION

1. Field of the Invention

This invention relates to motor vehicles and in particular to a motor vehicle having a roof structure that can be stowed away to form an open top vehicle.

2. Related Art

It is known, for example, from French Patent Publication FR-2856014 and German Patent Publication DE-19948746 to provide a motor vehicle having a roof structure which can be stowed away to convert the motor vehicle into an open top vehicle.

It is a disadvantage of such prior art mechanisms that the roof is stowed in a luggage area of the motor vehicle, thereby reducing the space available for the transport of luggage when the roof is stowed. It is a further problem with this type of mechanism that it can only be used for motor vehicles having a separate luggage compartment and luggage compartment cover and is not suitable for use with a hatchback type of vehicle.

It would be desirable to provide a motor vehicle in which the roof can be stowed without significantly reducing the volume of luggage that can be carried and which is applicable to a hatchback vehicle.

SUMMARY OF THE INVENTION

According to a first aspect of the invention, there is provided a motor vehicle having front and rear roof members moveable between raised and stowed positions, and a moveable flap located on each side of the motor vehicle to selectively bridge a longitudinally extending gap between the front roof member and an upper edge of a rear outer panel when the front roof member is in its stowed position, wherein each flap is moveable from a stowed position in which it is positioned substantially vertically in a storage compartment when the front roof member is in its raised position, to a deployed position in which the flap is positioned substantially horizontally so as to bridge the gap when the front roof member is in the stowed position.

Each flap may be positioned in the stowed position when the rear roof is in a raised position.

When the front and rear roof members are in respective raised positions, the front and rear roof members may form in combination a cover for a combined passenger and luggage compartment of the motor vehicle.

The motor vehicle may have front and rear rows of seats and a front wall of the luggage compartment may be formed by the rear row of seats.

The rear roof member may be stowed in front of the rear row of seats.

Each flap may be pivotally connected to a support member to allow the flap to rotate from the stowed position to the deployed position.

Each support member may be slidingly connected to part of a body structure of the motor vehicle so as to permit the support member to move between a raised position when the flap is in its deployed position and lowered position when the flap is in its stowed position.

The support member may be moveable between the lowered and raised positions by a cable connected to part of a mechanism used to stow the front roof member.

The storage compartment for each flap may be defined by a cavity between the rear outer panel and a rear inner panel.

The storage compartment for each flap may be formed by a cavity between the outer rear panel and a cover panel pivotally connected to an outer surface of the rear outer panel.

The rear outer panel may have a recess formed therein which in combination with the cover panel forms the storage compartment.

Each flap may be pivotally connected to part of a body structure of the motor vehicle by two spaced apart U-shaped arms, each of which is pivotally connected at one end to the body structure of the motor vehicle and is fastened at an opposite end to the flap.

At least one of the two arms may contact the cover panel to move the cover panel away from the outer rear panel during movement of the flap from the stowed position to the deployed position.

At least one of the U-shaped arms may have a roller rotationally connected thereto for rolling contact with a corresponding rib formed on an inner surface of the cover panel to move the cover panel away from the outer rear panel during movement of the flap from the stowed position to the raised position.

Both of the arms may have a roller rotationally connected thereto for rolling contact with a respective rib on the cover panel.

Each flap may be moveable between its stowed and deployed positions by a cable connected at one end to one of the two U-shaped arms and at an opposite end to part of a mechanism used to stow the front roof member.

According to a second aspect of the invention, there is provided a method for stowing a roof of a motor vehicle having a moveable front roof member, a moveable rear roof member and a moveable flap located on each side of the motor vehicle to selectively bridge a longitudinally extending gap between the front roof member and an upper edge of a rear outer panel when the front roof member is in a stowed position, the method comprising moving each flap from a stowed position in which it is positioned substantially vertically in a storage compartment when the front and rear roof members are in their respective raised positions towards a deployed position in which the flap is positioned substantially horizontally so as to bridge the gap when the front and rear roof members are moved from their respective raised position to their respective stowed positions.

Each flap may be slid upwards from the stowed position and then rotated to reach the deployed position.

Each flap may be moved upwards along an arc from the stowed position to the raised position.

BRIEF DESCRIPTION OF THE DRAWINGS

These and other features and advantages of the present invention will become more readily appreciated when considered in connection with the following detailed description and appended drawings, wherein:

FIG. 17 is a pictorial view of the flap shown in FIG. 13 and an associated actuation mechanism in the deployed position shown in FIG. 13.

DETAILED DESCRIPTION OF THE PREFERRED EMBODIMENT

Figure 1:
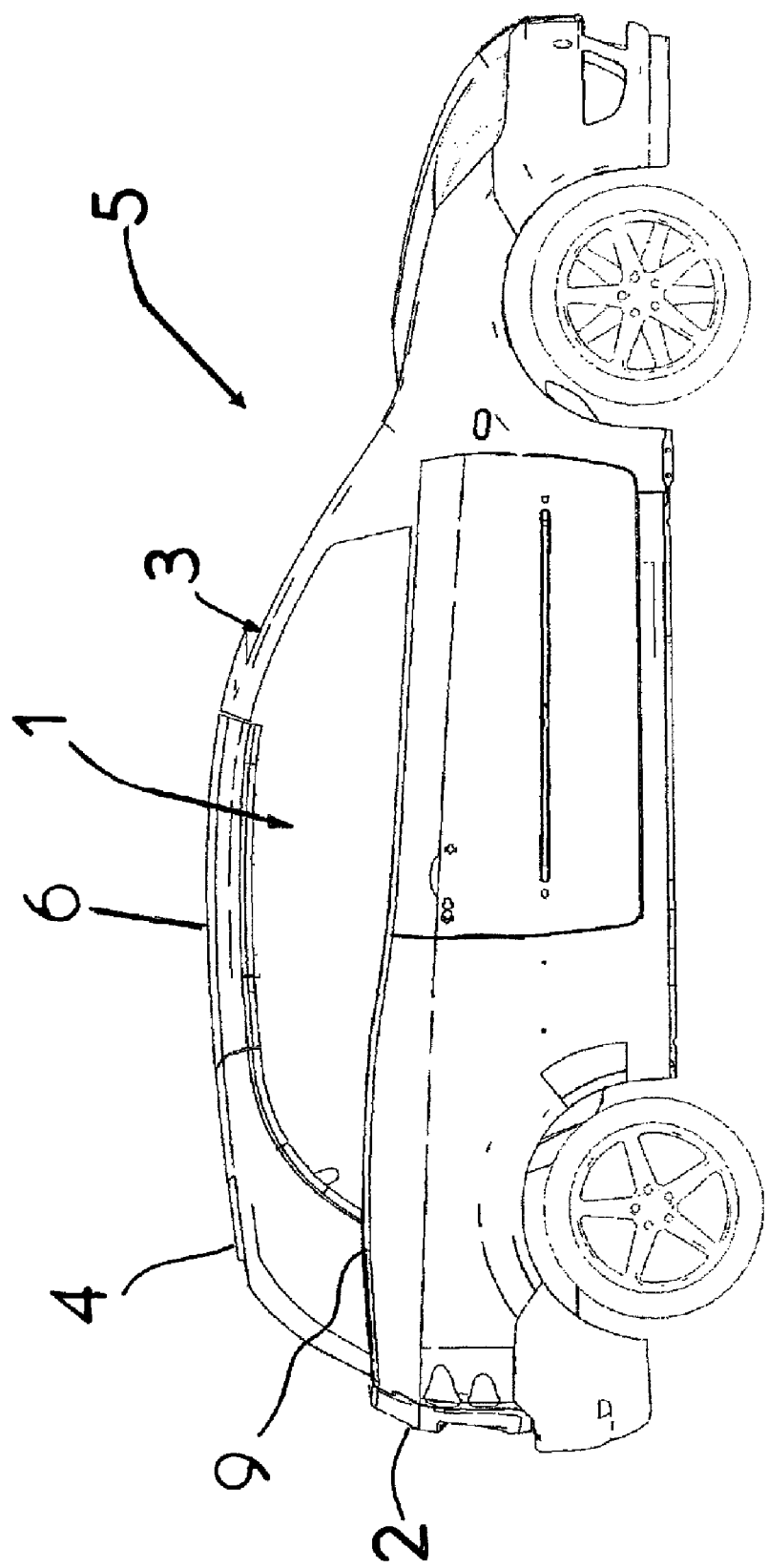
FIG. 1 is a side view of a motor vehicle according to the vehicle showing front and rear roof members in raised positions.
Figure 2:
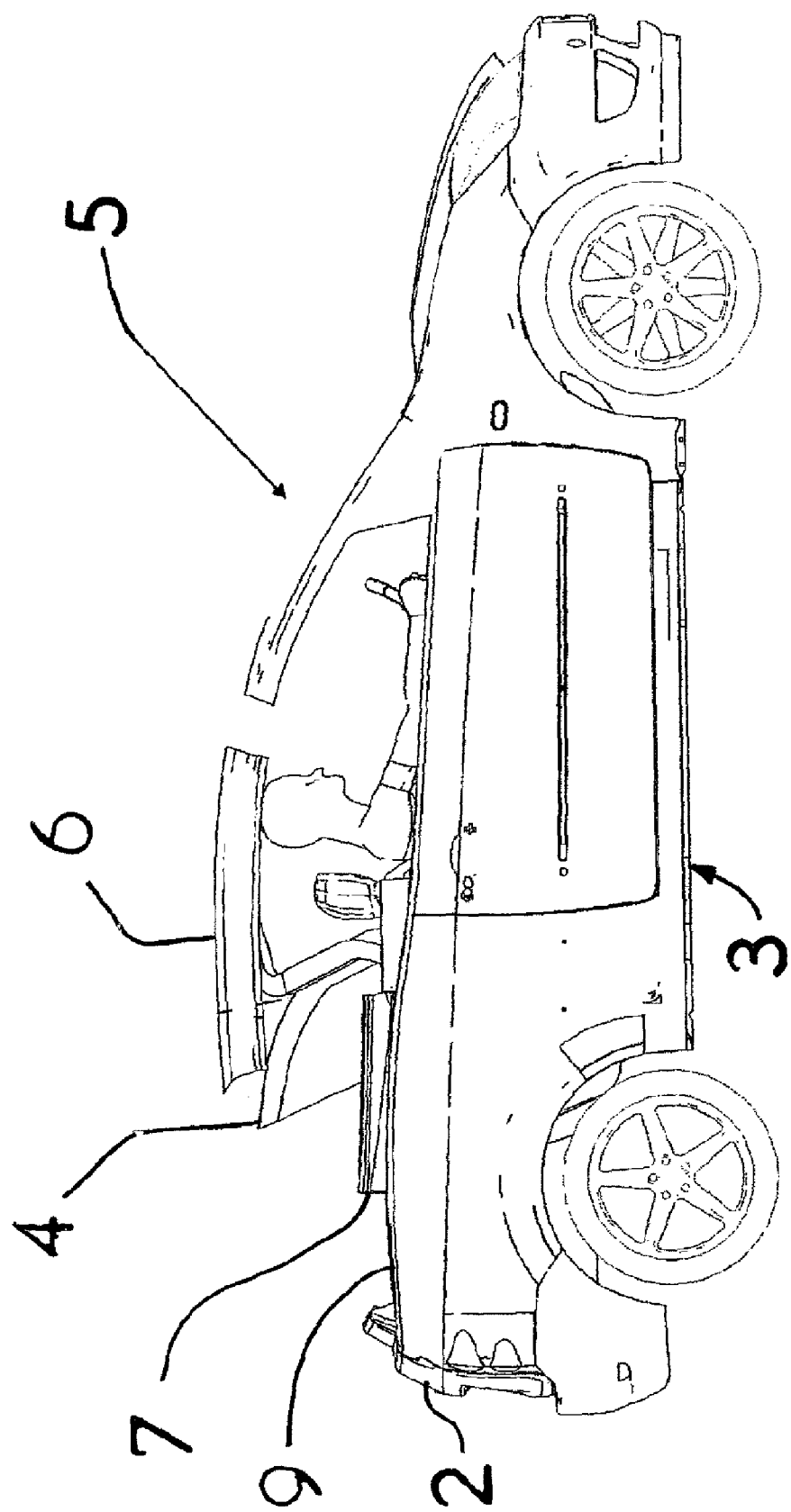
FIG. 2 is a side view similar to FIG. 1 but showing the front and rear roof members in partially stowed positions.
Figure 3:
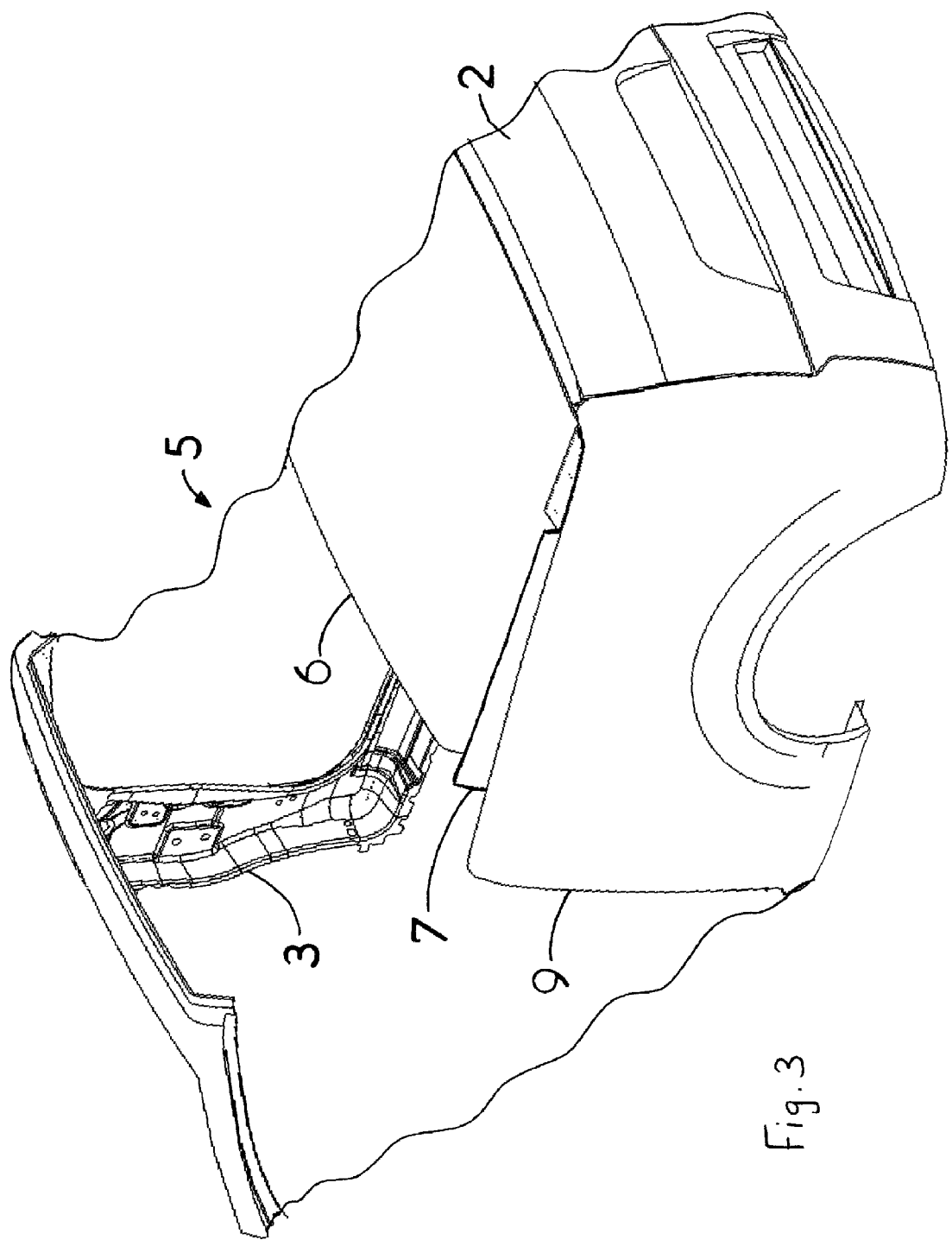
FIG. 3 is a pictorial view of a rear portion of the motor vehicle shown in FIGS. 1 and 2 showing the front roof member in its stowed position with a side filler flap partially deployed.
Figure 4:
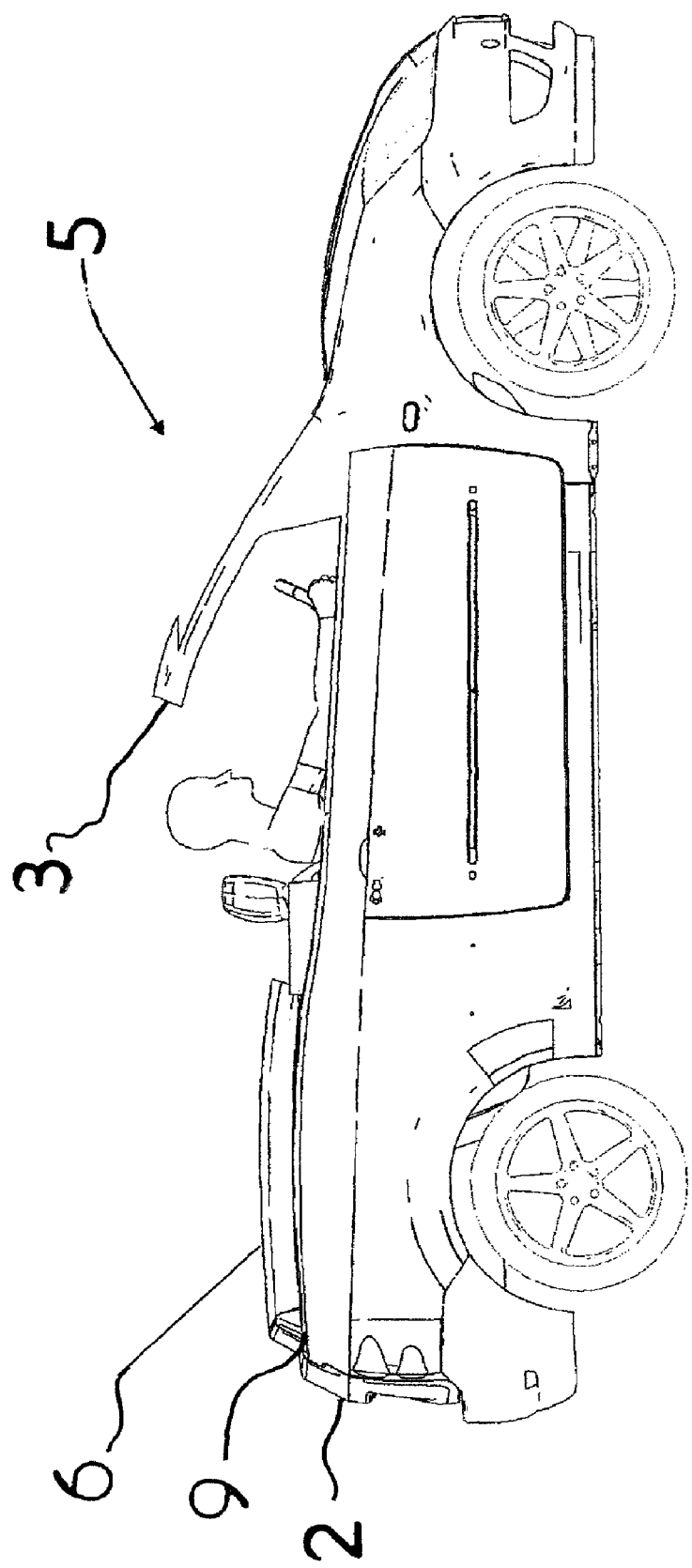
FIG. 4 is a side view similar to FIGS. 1 and 2 but showing the front and rear roof members in their fully stowed positions.
Figure 5:
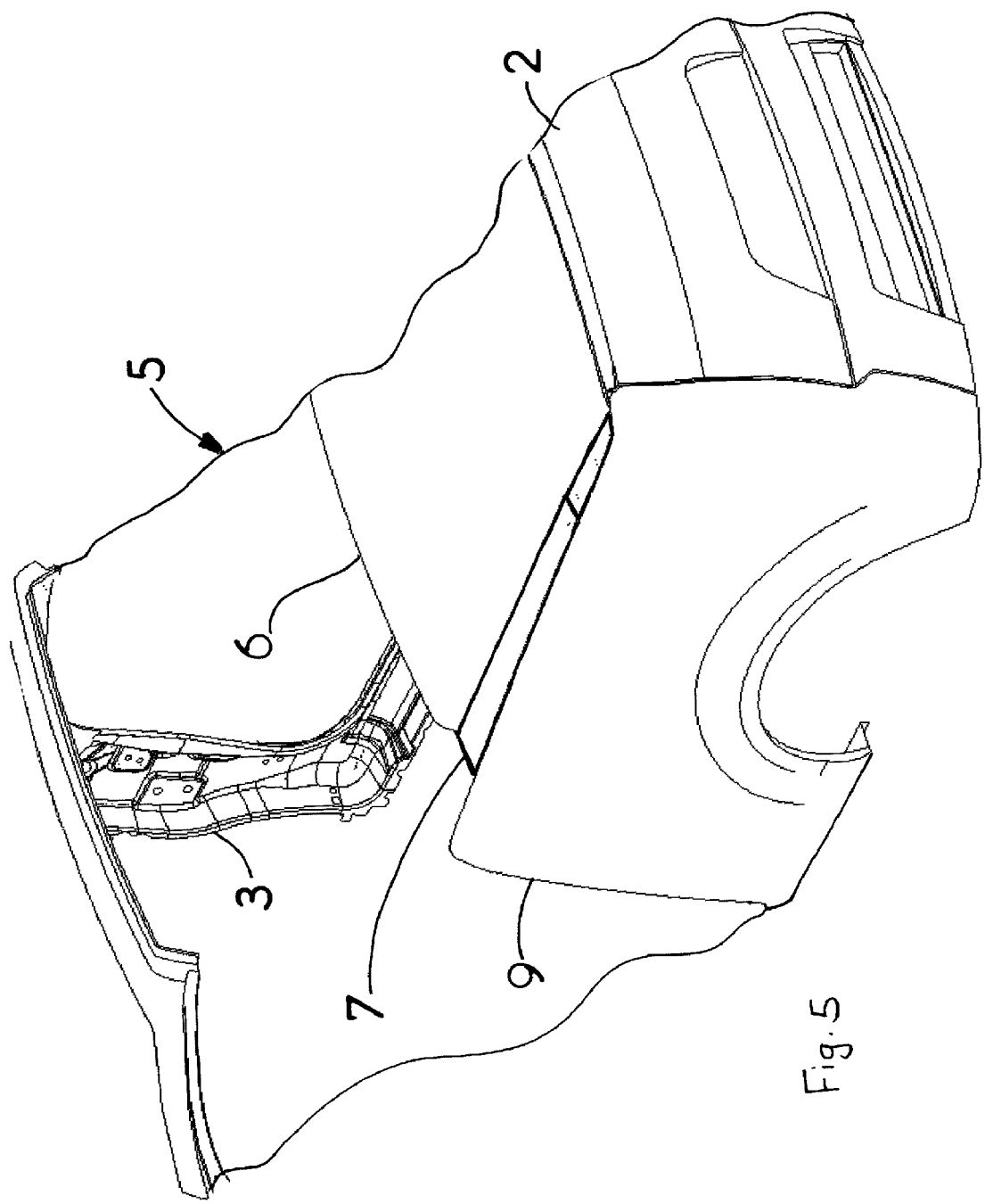
FIG. 5 is a pictorial view of the rear portion of the motor vehicle shown in FIG. 4 showing the front roof member in its stowed position with the side filler flap deployed.

Referring to the Figures, wherein like numerals indicate like or corresponding parts throughout the several views, With reference to FIGS. 1 to 11 there is shown a first embodiment of a motor vehicle 5 according to the invention. The motor vehicle 5 has a body structure 3 including a pair of rear outer panels 9, one on each side of the motor vehicle 5, a drop down lower tailgate 2, a rear roof member or panel 4 and a front roof member or panel 6. The front and rear roof members 6 and 4 are moveable from raised positions, as shown in FIG. 1, where they form in combination a cover for a combined passenger and luggage compartment 1 to stowed positions, as shown in FIGS. 4 and 5, where a two seat convertible vehicle is formed. FIG. 2 shows an intermediate position in which the front and rear roof members 6 and 4 are partially stowed.

To stow the two roof members 4 and 6, one of the two roof members 4 and 6 is firstly moved to disengage a rear edge of the front roof member 6 from a front edge of the rear roof member 4. This can be achieved by sliding the rear roof member 4 rearwardly, by providing an inclined shut face, such that the forwardly and downwardly rotating rear roof member 4 disengages from any seals through its normal motion or by lifting the front roof member 6. The rear roof member 4 is then rotated forwardly, moved forwardly and then lowered down such that it lies below a waistline of the motor vehicle 5 this can be achieved as distinct operations or simultaneous motion.

The motor vehicle 5 has two rows of seats located in the combined passenger and luggage compartment 1. There is a front row of seats including a seat for a driver of the motor vehicle 5 towards the front of the combined passenger and luggage compartment 1, and a rear row of seats which forms a front wall of the luggage compartment towards the rear of the combined passenger and luggage compartment 1. Such a vehicle is often referred to as a two box vehicle because there is no dividing wall between the luggage compartment and the passenger compartment, only a dividing wall between the passenger compartment and an engine compartment.

When the rear roof member 4 is in its stowed position, it lies between the front and rear row of seats and does not reduce the volume of the luggage area.

The front roof member 6 is moved at the same time as the rear roof member 4 from its raised position to its stowed position but the motions are phased such that the rear roof member 4 reaches its stowed position before the front roof member 6 reaches its stowed position.

When the front roof member 6 is in its stowed position it lies substantially horizontally across the rear of the motor vehicle 5 to form a cover for the luggage compartment of the motor vehicle 5. Access to the luggage compartment is still possible by opening the tailgate 2, and because the rear roof member 4 is stowed in front of the rear row of seats there is substantially no loss of luggage compartment volume.

However, when the front roof member 6 is in its stowed position, a longitudinally extending gap is present along each longitudinal edge of the front roof member 6 because the width of the front roof member 6 is less than the width of the motor vehicle body at its waistline.

In order to cover the longitudinally extending gaps, the motor vehicle 5 has two flaps 7, one on each side of the motor vehicle 5, which are deployed to cover the gaps when the front roof 6 is stowed. The flaps 7 are stowed in respective storage compartments when the front roof member 6 is in its raised position.

With particular reference to FIGS. 6 to 11, one of the flaps 7 and an associated actuation mechanism is shown in greater detail.

The flap 7 is pivotally connected by means of a piano hinge 17 to a support member in the form of a carrier plate 18, which is attached at a lower end to a cable 11 used to actuate the flap 7.

The carrier plate 18 has a guide rail 24 attached thereto near to one side for sliding engagement with a U-shaped support 25 fastened to part of the body structure 3. On an opposite side of the carrier plate 18 an outwardly extending finger 22 is formed as part of the carrier plate 18 for sliding engagement with a groove 21 formed in a second U-shaped support 20. An upper end of the second U-shaped support is formed into a curved guide 23 for the flap 7.

Figure 6:
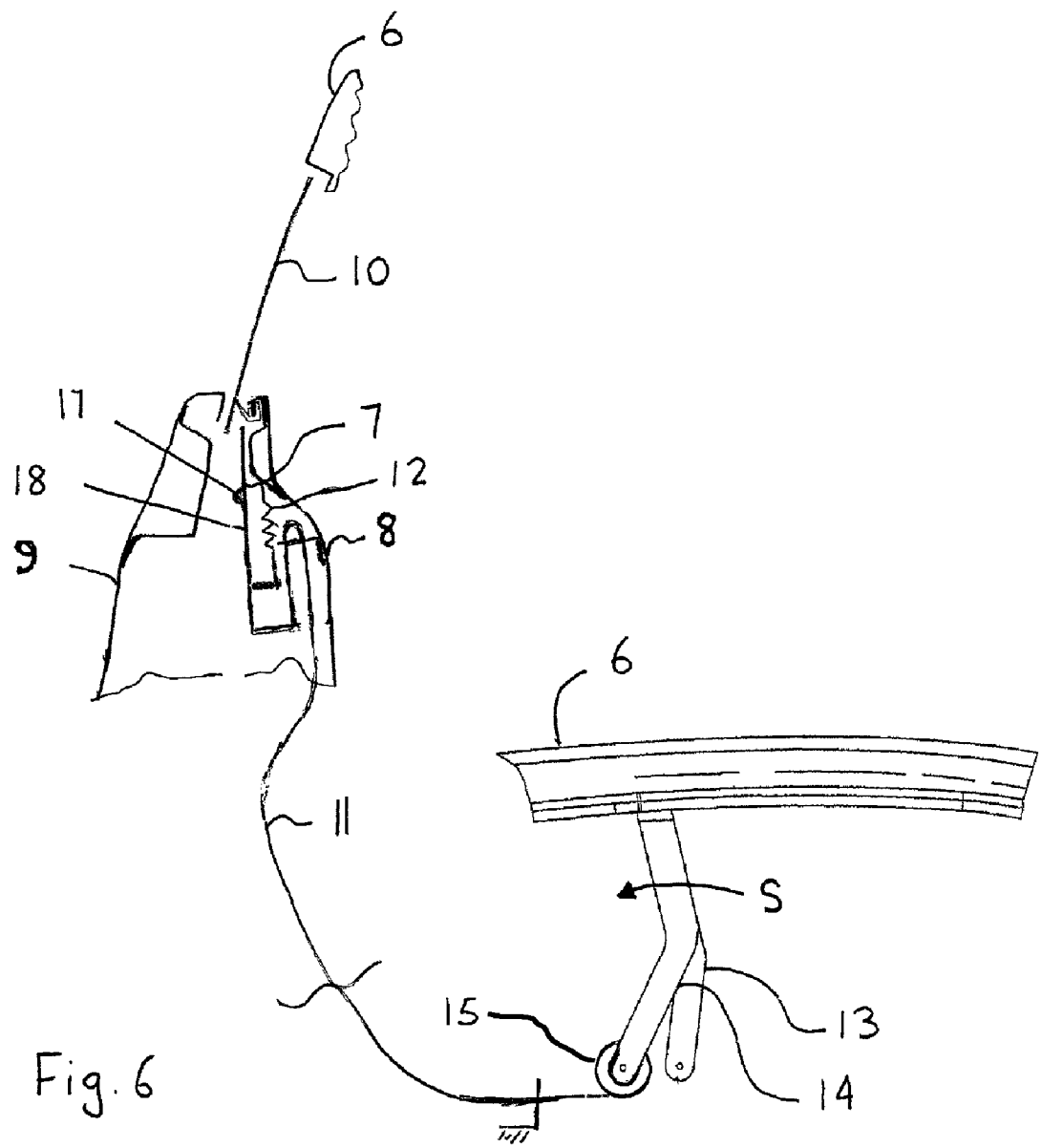
FIG. 6 is a diagrammatic representation of an actuation mechanism for the flap show in FIGS. 3 and 5.

As is shown in FIG. 6, the cable 11 is connected at an opposite end to a pulley 15 fastened to an arm 14 used to move the front roof member 6 between its respective raised and stowed positions. A second arm 13 is also connected to the front roof member 6 to control the motion of the front roof member 6 so as to ensure that it is substantially horizontally arranged when it is in its raised and stowed positions.

A spring 12 is positioned between the carrier plate 18 and the body structure 3 to bias the flap 7 into its stowed position, and the cable 11 is used to pull the carrier plate 18 upwardly so as to move the flap 7 into its deployed position. That is to say, when the arm 14 moves in the direction of arrow "S" on FIG. 6 to move the front roof member 6 towards the stowed position, the cable 11 is wrapped around the pulley 15 thereby pulling the carrier plate 18 upwards against the action of the spring 12. A further spring (not shown) can be attached between the flap 7 and the carrier plate 18 to ensure that the flap 7 is moved into a horizontal position when it is deployed.

When the front roof member 6 moves from its stowed position towards its raised position, the cable 11 is unwrapped from the pulley 15, thereby allowing the flap 7 to move to its stowed position due to the action of the spring 12.

As can be seen on FIG. 6, the flap 7 is stowed in a substantially vertical position in a storage compartment formed by a cavity defined between the rear outer panel 9 and a rear inner panel 8. This cavity is also used to stow a drop down side window 10 when the side window 10 is lowered.

Figure 7:
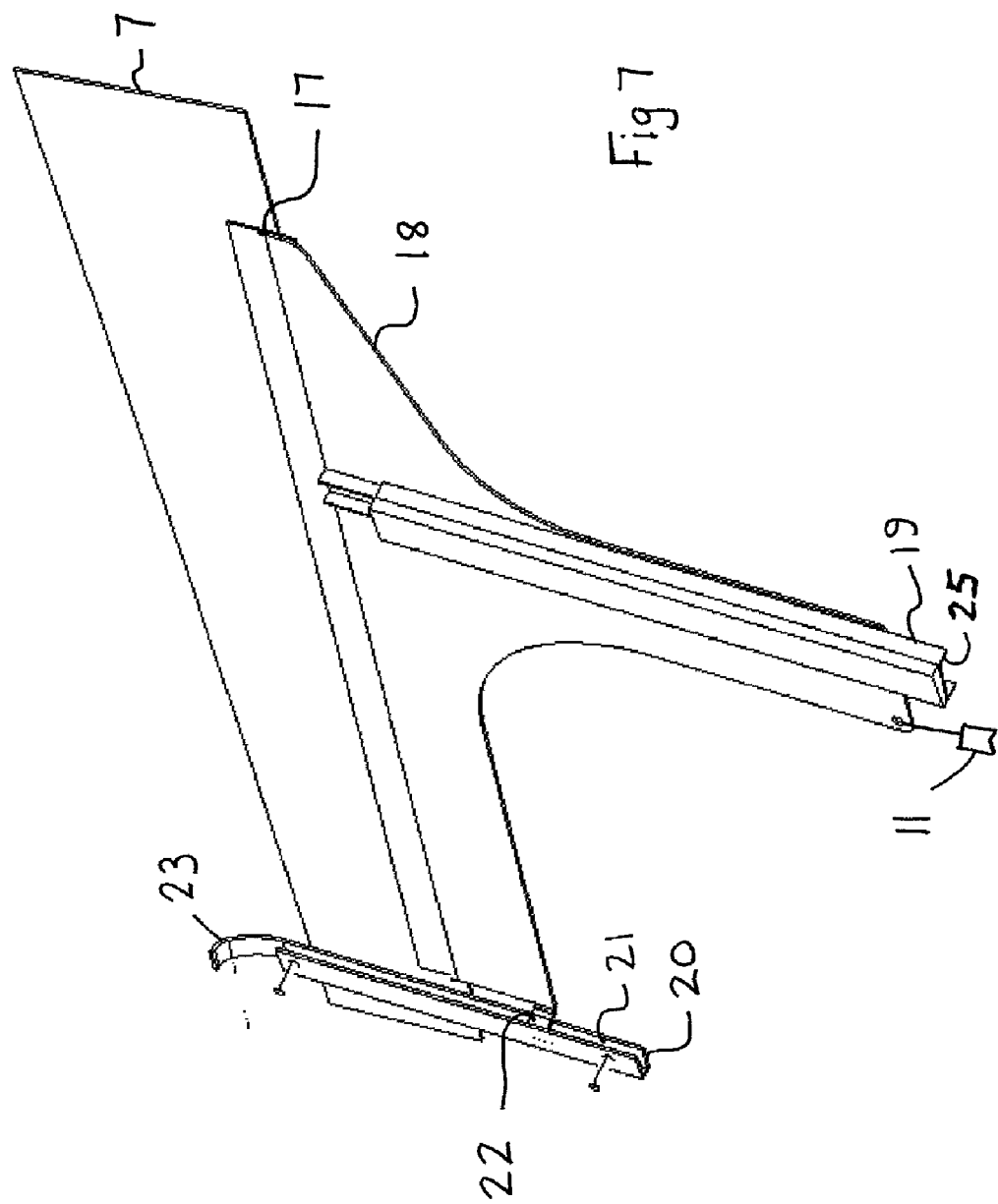
FIG. 7 is a pictorial view of the flap shown in FIGS. 3 and 5 and an associated actuation mechanism in a stowed position.
Figure 8:
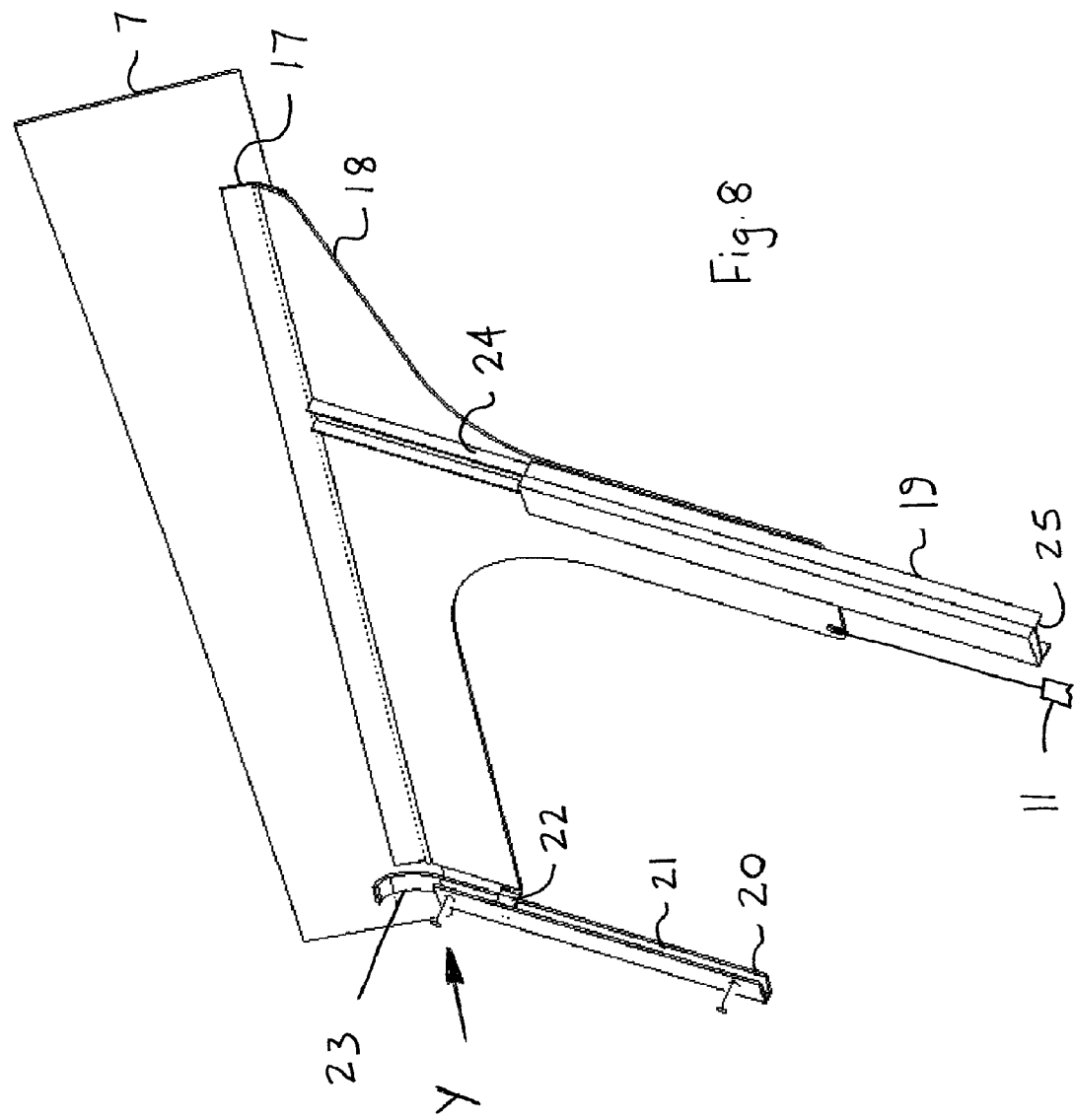
FIG. 8 is a pictorial view of the flap shown in FIGS. 3 and 5 and an associated actuation mechanism in a partially deployed position.
Figure 10:
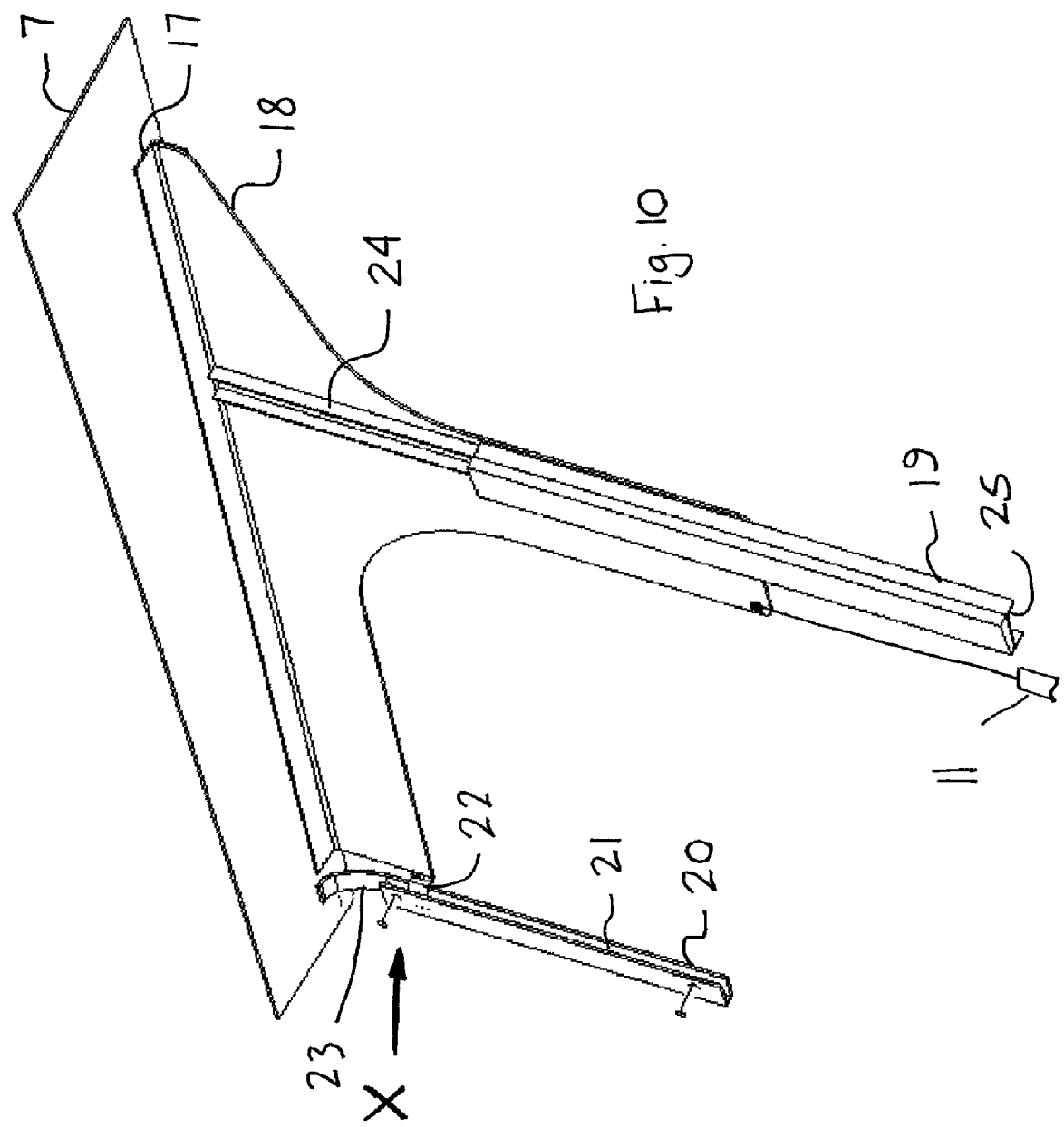
FIG. 10 is a pictorial view of the flap shown in FIGS. 3 and 5 and an associated actuation mechanism in a deployed position.

FIGS. 7, 8 and 10 show an alternative arrangement in which the cable 11 is connected directly to a lower edge of the carrier plate 18. In this case the carrier plate 18 is biased by one or more springs (not shown) so as to move the flap 7 to the deployed position, and is pulled back into the stowage compartment when the front roof member 6 moves towards the raised position. The cable 11 in this case is wrapped further around the pulley 15 when the front roof member 6 moves towards its raised position, and is unwrapped from the pulley 15 when the front roof member 6 moves towards its stowed position. As before, a spring (not shown) may be attached between the flap 7 and the carrier plate 18 to bias the flap 7 towards its deployed orientation of substantially 90 degrees to the carrier plate 18.

Although in both of the examples described above the flap 7 is moved between its deployed and stowed positions by a cable 11 connected to the front roof stowage mechanism this need not be the case and the flap 7 could be moved independently by any other suitable means.

Each of the flaps 7 is arranged to be in its respective stowed position whenever the front or rear roof members 6 and 4 are in their respective raised positions and is only moved to the deployed position when the front and rear roof members 6 and 4 are stowed.

It will be appreciated that the sequencing of the movement of the flaps 7 need not be simultaneous with the movement of the front roof member 6 and that the flaps 7 could also be arranged to be deployed so that they are already deployed when the front roof member 6 reaches its stowed position, or be deployed after the front roof member 6 has reached its stowed position if independent actuation of the flaps 7 is used.

FIG. 7 shows the flap 7 in its stowed position in which the flap 7 is substantially vertically arranged.

Figure 9:
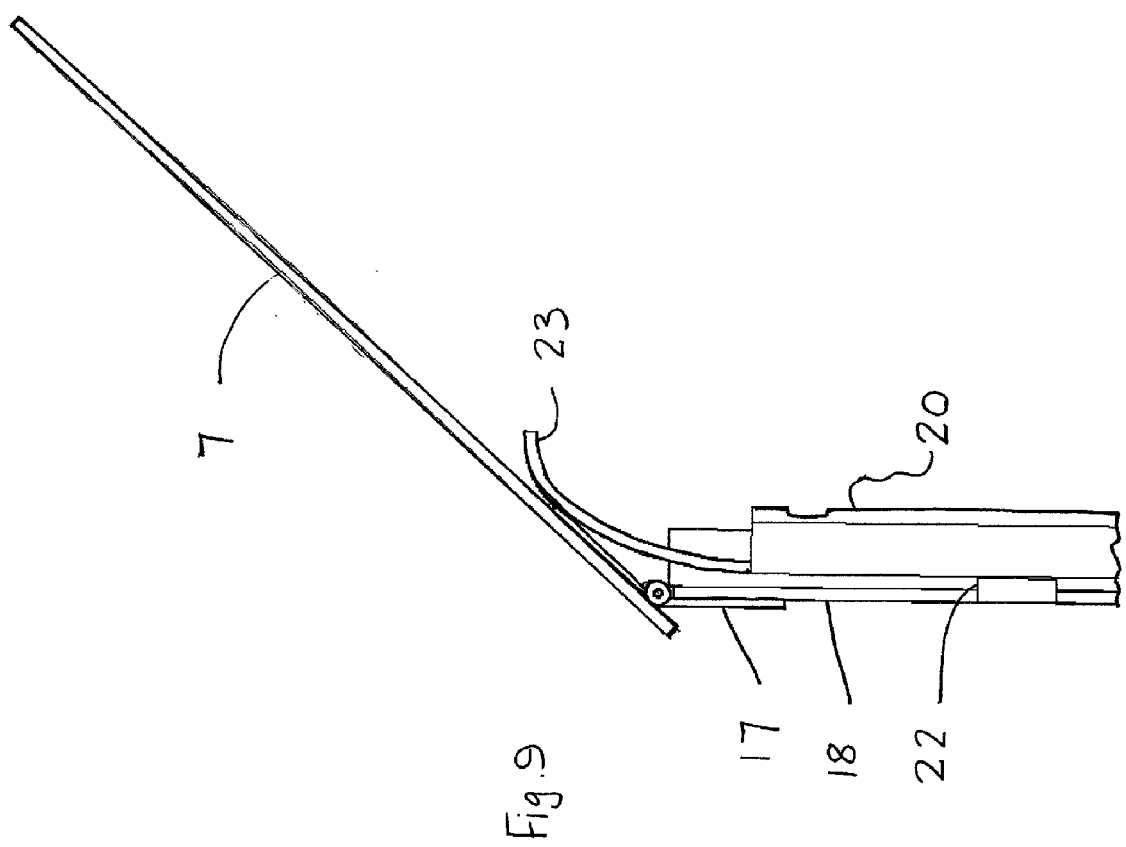
FIG. 9 is an enlarged end view in the direction of arrow Y on FIG. 8.

FIGS. 8 and 9 show the flap 7 in a partially deployed position with the flap 7 resting upon the curved guide 23. The curved guide 23 is used to control the rotation of the flap 7 as it transits between its stowed and deployed positions.

Figure 11:
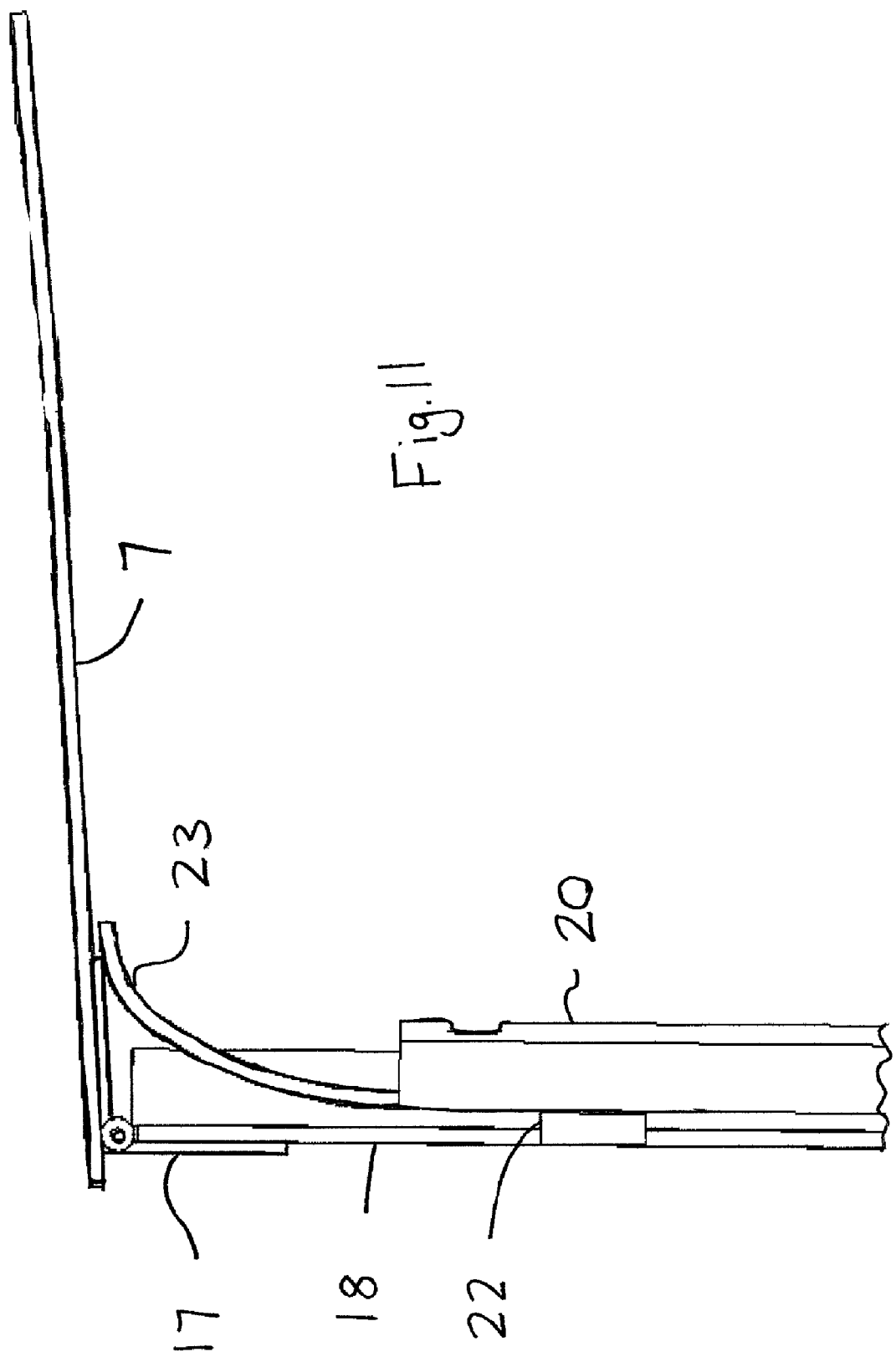
FIG. 11 is an enlarged end view in the direction of arrow X on FIG. 10.
Figure 12:
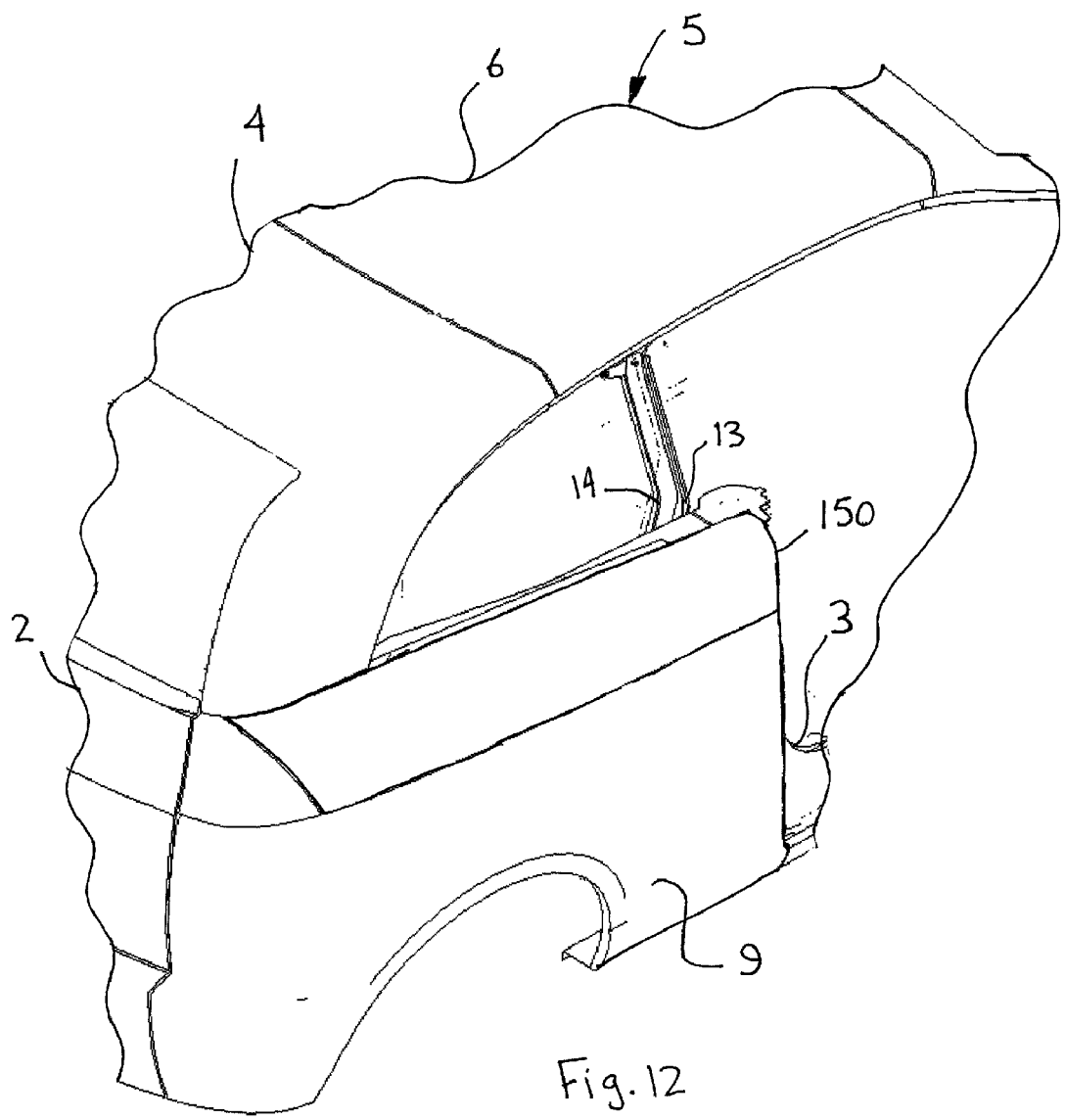
FIG. 12 is a pictorial view of a rear portion of a motor vehicle according to a second embodiment of the invention showing front and rear roof members in their raised positions.
Figure 13:
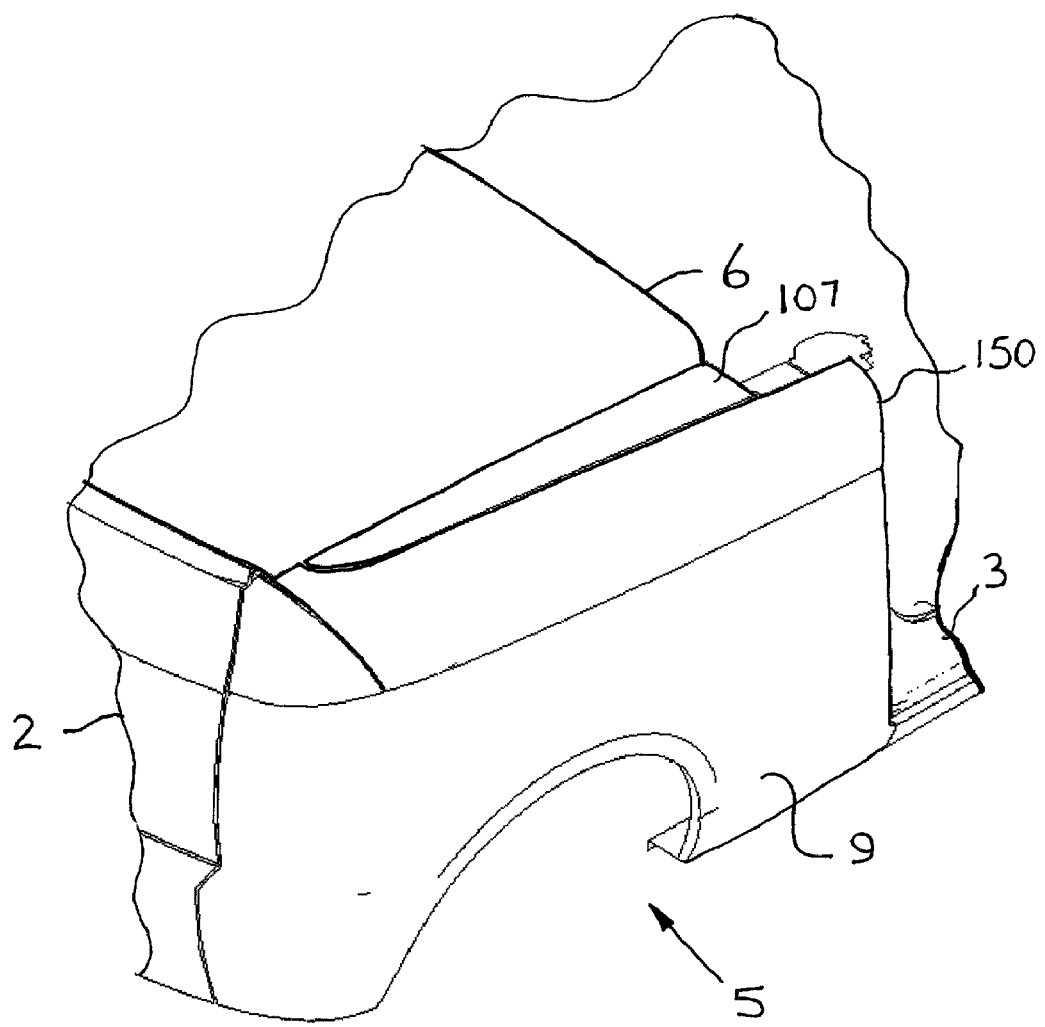
FIG. 13 is a pictorial view of the rear portion of the motor vehicle shown in FIG. 12 showing the front roof member in its stowed position with a side filler flap deployed.

FIGS. 10 and 11 show the flap 7 in its deployed position in which it is resting against the curved guide 23. The flap 7 is in this position substantially horizontally disposed and is arranged at approximately 90 degrees to the carrier plate 18.

With reference to FIGS. 12 to 17, there is shown a second embodiment of the invention which differs from that previously described in that the flap 107 is not stowed between inner and outer panels of the motor vehicle 5 but in a separate stowage compartment located outside the rear panel, and the flap 107 is not actuated by a sliding mechanism as previously described but by a rotating arm arrangement that moves the flap 107 though an arc.

Figure 14:
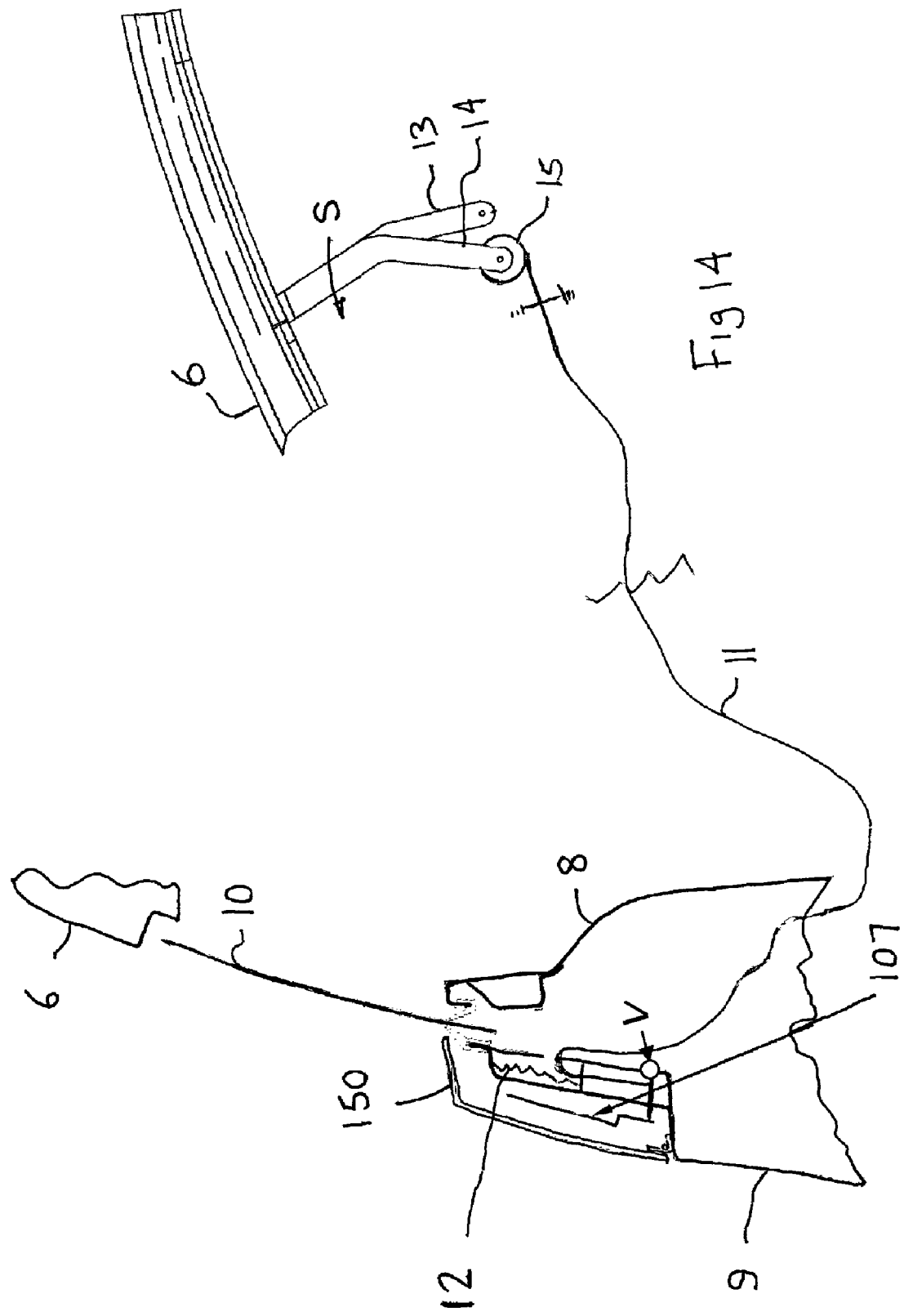
FIG. 14 is a diagrammatic representation of an actuation mechanism for the flap show in FIG. 13.

With reference to FIG. 14 (which is diagrammatic and does not show in detail the actuation mechanism), the flap 107 is shown in its stowed position within a stowage compartment formed by a recess in the rear outer panel 9 and a moveable cover panel 150 pivotally connected at its lower end to an outer surface of the rear outer panel 9. The cavity defined between the outer rear panel 9 and the inner rear panel 8 is not in this case occupied by the flap 107 or its actuating mechanism, and so there is more room for the drop down window 10 to be stowed in the cavity and, if required, more room for reinforcement of the body structure to be added in the cavity.

As before, a cable 11 is connected at one end to the flap actuation mechanism and at an opposite end to the pulley 15 fastened to the arm 14 used to move the front roof member 6 between its respective raised and stowed positions.

As before, a spring 12 is used to bias the flap 107 into its stowed position, and the cable 11 is used to pull the flap 7 into its deployed position. That is to say, when the arm 14 moves in the direction of arrow "S" shown on FIG. 14 to move the front roof member 6 towards the stowed position, the cable 11 is wrapped around the pulley 15 thereby pulling the flap 107 upwards against the action of the spring 12.

The flap is connected to a first arm pivotable about the point "V" (corresponding to a pivot axis), and the cable 11 is attached to a second arm connected to the first arm so that the flap 107 is not slid up into position but is rotated into the deployed position along an arc defined by the geometry of the flap actuating mechanism.

Figure 15:
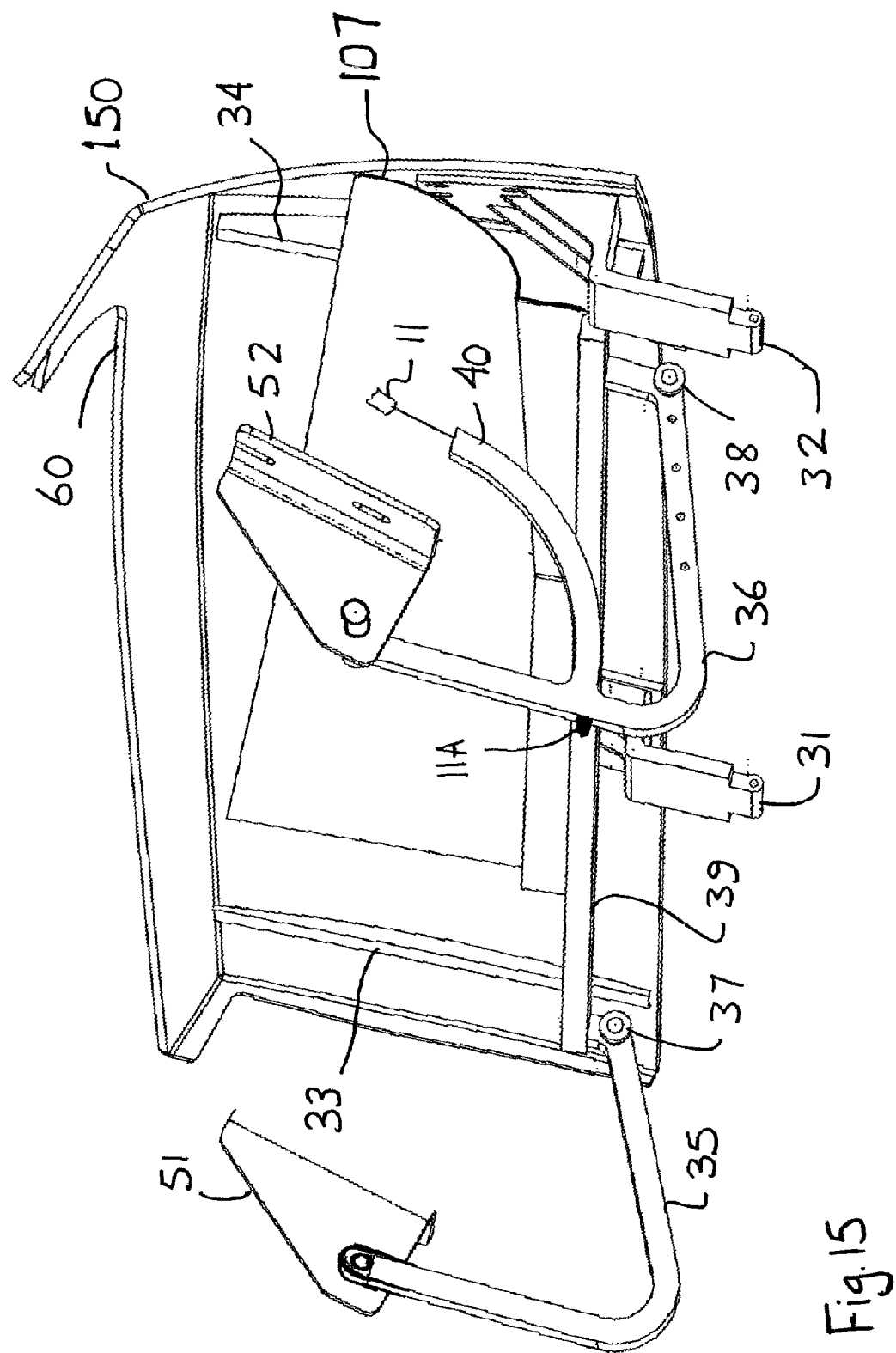
FIG. 15 is a pictorial view of the flap shown in FIG. 13 and an associated actuation mechanism in a stowed position.
Figure 16:
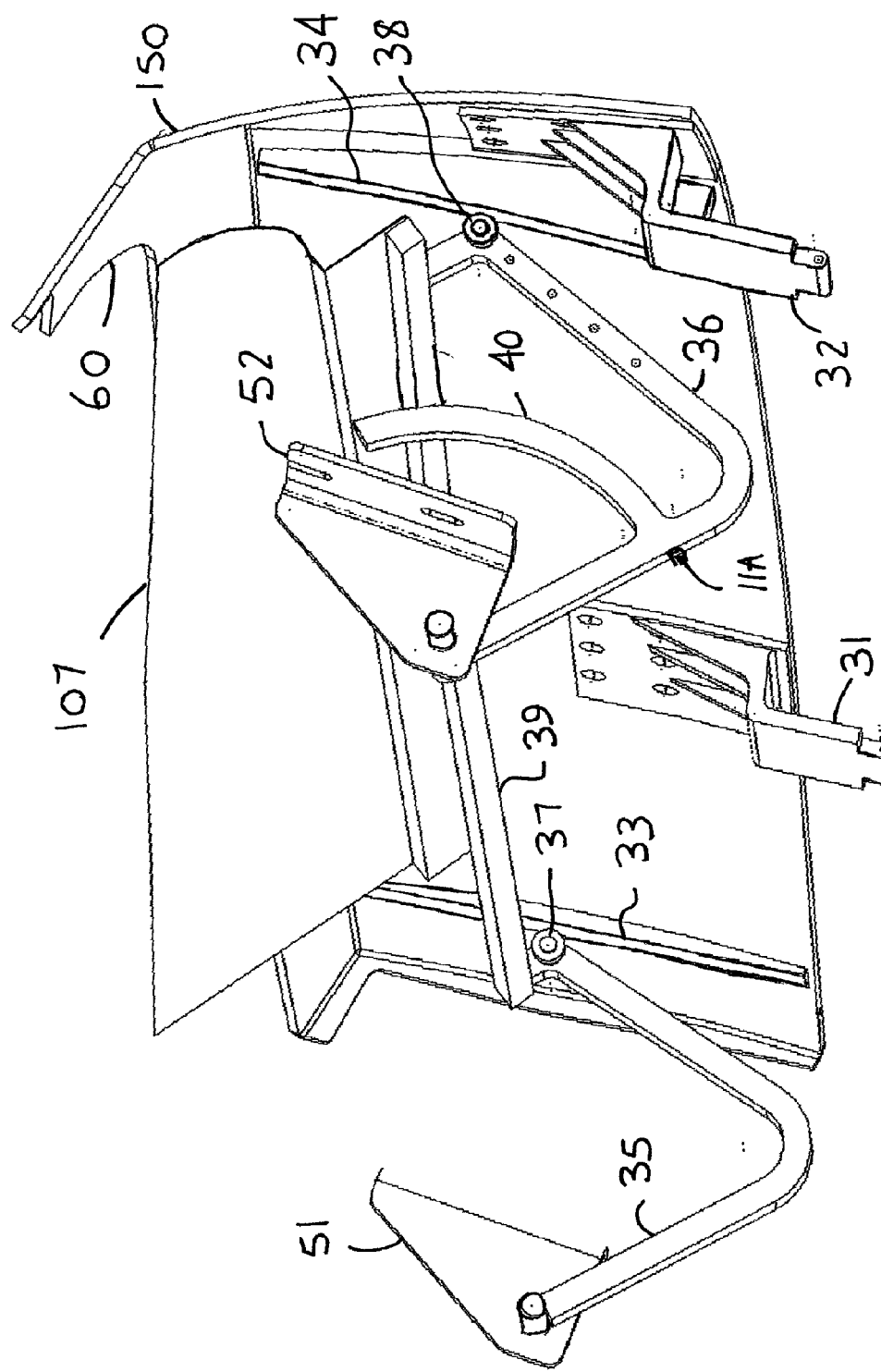
FIG. 16 is a pictorial view of the flap shown in FIG. 13 and an associated actuation mechanism in a partially deployed position.

Referring now to FIGS. 15 to 17, which show the actuating mechanism for the flap 107 in greater detail, the flap 107 is connected along one of its two longitudinal edges to a cross bar 39 used to connect two spaced apart arms 35, 36 to the flap 107.

Each of the arms 35, 36 is U-shaped and is pivotally connected at one end to a respective bracket 51, 52 used to fasten the actuating mechanism to part of the body structure of the motor vehicle 5. The two arms 35, 36 are therefore able to pivot about a substantially horizontal pivot axis (corresponding to the point "V" on FIG. 14) extending between the two brackets 51, 52. At an opposite end to where it is pivotally connected to one of the brackets 51, 52, each arm 35, 36 is fastened to the cross bar 39.

One of the arms 36 has a curved extension 40 formed with a groove (not shown) in which the cable 11 is located. The cable 11 extends from the groove through an aperture (not shown) in the arm 36 and has a retainer cap 11A fitted to its free end, which is used to transfer force from the cable 11 into the arm 36 when the cable 11 is pulled.

Each of the arms 35, 36 has a respective roller 37, 38 attached thereto for engagement with a respective rib 33, 34 formed on an inner surface of the cover panel 150. Each of the ribs 33, 34 forms a track along which the corresponding roller 37, 38 can roll.

The cover panel 150 has an aperture 60 formed in an upper surface to conform with one edge of the flap 107 and, when the flap 107 is in its deployed position, the flap 107 is located within the aperture 60. When the rear roof member 4 is in its raised position, at least a portion of the rear roof member 4 overlies the aperture 60 and the upper surface of the cover panel 150 so that the cover panel 150 is held in a closed position while the rear roof member 4 is in its raised position. The cover panel 150 is pivotally connected at a lower end by two arms 31, 32 each of which is hingedly connected to an outer surface of the outer rear panel 9.

As shown in FIG. 15, when the flap 107 is in its stowed position, the rollers 37, 38 are not in contact with the ribs 33, 34, and the cover panel 150 is in a closed position.

When the flap 107 is moved towards its deployed position, the rollers 37, 38 come into contact with the ribs 33, 34 and open the cover panel 150 to allow the flap 107 to move up into its deployed position. At the position shown in FIG. 16, the cover panel 150 is fully open because the rollers 37, 38 are positioned at the maximum horizontal distance to the outside of the horizontal pivot axis of the two arms 35, 36 between the pivot axis and the cover panel 150.

When the flap 107 reaches its deployed position as shown in FIG. 17, the rollers 37, 38 have gone over-centre and the horizontal distance between the rollers 37, 38 and the pivot axis of the arms 35, 36 is less than the maximum horizontal distance, thereby allowing the cover panel 150 to move to its closed position.

Depending upon the design of the arms 35, 36, the rollers 37, 38 are now, as shown, lightly resting against the ribs 33, 34 or are spaced apart from the ribs 33, 34 so that no contact occurs between the ribs 33, 34 and the rollers 37, 38. One or more springs (not shown) is provided to bias the cover panel 150 towards its closed position, the cover panel 150 being opened when it is acted against by the rollers 37, 38.

It will be appreciated that when the flap 107 is moved from the deployed position to the stowed position, the cover panel 150 is opened to permit stowing of the flap 107 and then closed again before the rear roof member 4 reaches its raised position.

Although the flap 107 is described above as being moved between its deployed and stowed positions by a cable connected to the front roof stowage mechanism, this need not be the case, and the flap 107 could be moved independently by any other suitable means.

As before, each of the flaps 107 is arranged to be in its respective stowed position whenever the front or rear roof members 6 and 4 are in their respective raised positions, and are only moved to the deployed position when the front and rear roof members 6 and 4 are stowed.

It will be appreciated that the sequencing of the movement of the flaps 107 need not be simultaneous with the movement of the front roof member 6, and that the flaps 107 could also be arranged to be deployed so that they are already deployed when the front roof member 6 reaches its stowed position, or be deployed after the front roof member 6 has reached its stowed position if independent actuation of the flaps is provided.

Therefore in summary, a motor vehicle according to this invention is transformable from a hatch back type motor vehicle into a two seat type convertible vehicle with no substantial reduction in luggage capacity by stowing a front roof member such that it forms a cover for the luggage compartment, and by providing a flap on each side of the motor vehicle that bridge gaps between the stowed front roof and rear outer panels of the motor vehicle. Each flap is moved from a stowed position, in which it is positioned substantially vertically in a storage compartment when the front and rear roof members are in their respective raised positions, towards a deployed position, in which the flap is positioned substantially horizontally so as to bridge the gap, when the front and rear roof members are moved from their respective raised position to their respective stowed positions.

It will be appreciated by those skilled in the art that although the invention has been described by way of example with reference to one or more embodiments, it is not limited to the disclosed embodiments, and that modifications to the disclosed embodiments or alternative embodiments could be constructed without departing from the scope of the invention.

The foregoing invention has been described in accordance with the relevant legal standards, thus the description is exemplary rather than limiting in nature. Variations and modifications to the disclosed embodiment may become apparent to those skilled in the art and fall within the scope of the invention. Accordingly the scope of legal protection afforded this invention can only be determined by studying the following claims.

The invention claimed is:

1. A motor vehicle comprising:
   front and rear roof members moveable between raised positions in which the front and rear roof members form in combination a cover for a combined passenger and luggage compartment of the motor vehicle and stowed positions in which the front roof member lies substantially horizontally across the rear of the motor vehicle,
   a drop down side window moveable between a raised position in which it is co-operable with at least the rear roof member when the rear roof member is in its raised position and a stowed position in which it is stowed in a cavity between a rear outer panel and a rear inner panel and
   moveable flaps located on each side of the motor vehicle to selectively bridge a longitudinally extending gap between the front roof member and an upper edge of the rear outer panel when the front roof member is in its stowed position, wherein each flap is moveable from a stowed position in which it is positioned substantially vertically in a storage compartment when the front roof member is in its raised position, to a deployed position in which the flap is positioned substantially horizontally so as to bridge the gap when the front roof member is in its stowed position, wherein the motor vehicle has front and rear rows of seats and a front wall of the luggage compartment is formed by the rear row of seats and wherein the rear roof member is stowed between the front and rear rows of seats.

2. A motor vehicle as claimed in claim 1, wherein each flap is positioned in the stowed position when the rear roof member is in its raised position.

3. A motor vehicle as claimed in claim 1, wherein each flap is pivotally connected to a support member to allow the flaps to rotate from the stowed position to the deployed position.

4. A motor vehicle as claimed in claim 3, wherein each support member is slidingly connected to part of a body structure of the motor vehicle so as to permit the support member to move between a raised position when flap is in its deployed position, and lowered position when flap is in its stowed position.

5. A motor vehicle as claimed in claim 4, wherein the support member is moveable between the lowered and raised positions by a cable connected to part of a mechanism used to stow the front roof member.

6. A motor vehicle as claimed in claim 1, wherein the storage compartment for each flap is defined by the cavity between the rear outer panel and the rear inner panel.

7. A motor vehicle as claimed in claim 1, wherein the storage compartment for each flap is formed between a recess in the rear outer panel and a cover panel pivotally connected to an outer surface of the rear outer panel.

8. A motor vehicle as claimed in claim 7, wherein each flap is pivotally connected to part of a body structure of the motor vehicle by two spaced apart U-shaped arms, each of which is pivotally connected at one end to the body structure of the motor vehicle and is fastened at an opposite end to the flaps.

9. A motor vehicle as claimed in claim 8, wherein at least one of the two arms contacts the cover panel to move the cover panel away from the rear outer panel during movement of the flaps from the stowed position to the deployed position.

10. A motor vehicle as claimed in claim 9, wherein at least one of the U-shaped arms has a roller rotationally connected thereto for rolling contact with a corresponding rib formed on an inner surface of the cover panel to move the cover panel away from the rear outer panel during movement of the flaps from the stowed position to the raised position.

11. A motor vehicle as claimed in claim 8, wherein each flap is moveable between its stowed and deployed positions by a cable connected at one end to one of the two U-shaped arms, and at an opposite end to part of a mechanism used to stow the front roof member.

12. A method for stowing a roof of a motor vehicle having:

a moveable front roof member, a moveable rear roof member, a drop down side window located on each side of the motor vehicle each of which is moveable between a raised position in which it co-operates with at least the rear roof member when the rear roof member is in its raised position and a stowed position in which it is stowed in a storage compartment and a moveable flap located on each side of the motor vehicle to selectively bridge a longitudinally extending gap between the front roof member and an upper edge of a rear outer panel when the front roof member is in a stowed position, the method comprising sliding each flap upwards from a stowed position in which it is positioned substantially vertically in the storage compartment when the front and rear roof members are in their respective raised positions and then rotating each flap into a deployed position in which the flaps are positioned substantially horizontally so as to bridge the gap when the front and rear roof members are moved from their respective raised positions to their respective stowed positions.

\* \* \* \* \*